United States Patent [19]
Cook

[11] Patent Number: 5,979,366
[45] Date of Patent: Nov. 9, 1999

[54] CAT ENTERTAINMENT BOX

[76] Inventor: Kelly E. Cook, 2305 Hunter Rd., Greensburg, Pa. 15601-4945

[21] Appl. No.: 09/138,385
[22] Filed: Aug. 24, 1998
[51] Int. Cl.$^6$ ................................................ A10K 15/02
[52] U.S. Cl. .......................... 119/702; 119/706; 119/707; 40/312
[58] Field of Search ..................... 119/702, 707, 119/706, 711; 40/312, 313, 720, 538; 472/70, 57; 446/82, 100; D21/420, 659, 811; D30/160

[56] References Cited

U.S. PATENT DOCUMENTS

| | | | |
|---|---|---|---|
| D. 315,186 | 3/1991 | Peterson | D21/237 |
| 764,207 | 7/1904 | Robinson | 40/538 |
| 1,522,201 | 1/1925 | Mittleburg | 40/312 |
| 2,804,199 | 8/1957 | Essick | 206/736 |
| 3,061,880 | 11/1962 | Weisbach | 249/104 |
| 3,561,757 | 2/1971 | Schillig | 482/35 |
| 3,774,332 | 11/1973 | Schneider | 40/152.1 |
| 4,301,766 | 11/1981 | Piccone | 119/482 |
| 4,347,807 | 9/1982 | Reich | 119/499 |
| 4,854,060 | 8/1989 | Corbo et al. | 40/152.1 |
| 5,722,446 | 3/1998 | Zheng | 135/125 |

Primary Examiner—Michael J. Carone
Assistant Examiner—Son T. Nguyen

[57] ABSTRACT

A cat entertainment box including a box with a front face, a left face, a right face, and a rear face, a top. The edges of the top and floor and four faces are coupled together at their edges to form an integral rectilinear configuration. A hole is located in the top adjacent to the front face and essentially spaced from the side faces with indicia on the top with a top hole. The top hole allows entrance and egress of a cat into and out of the box. A design is on the front face, left face, right face and rear face. An aperture is formed in the front, left and right faces centrally located between the adjacent side edges and closer to the top edge than the bottom edge.

1 Claim, 2 Drawing Sheets

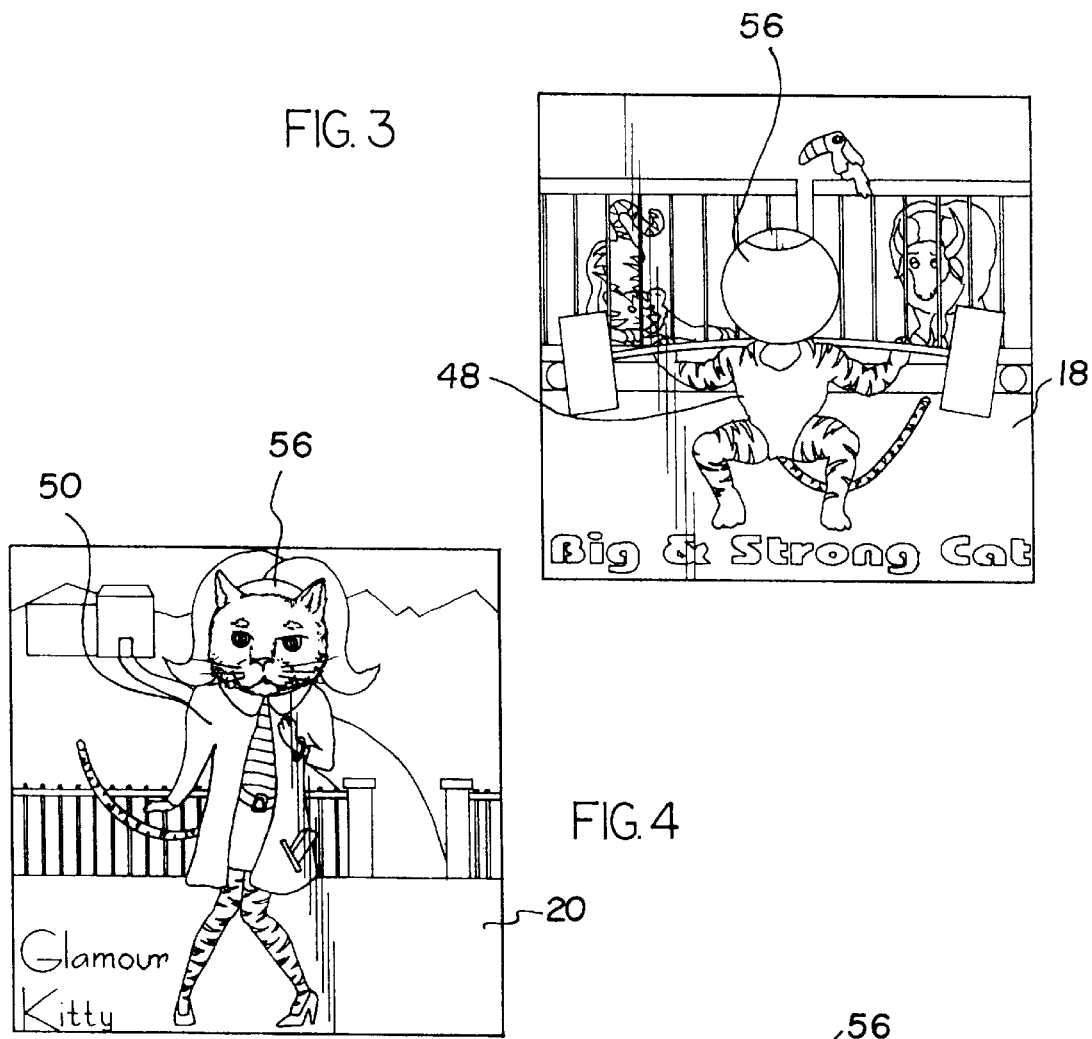
FIG. 3
FIG. 4
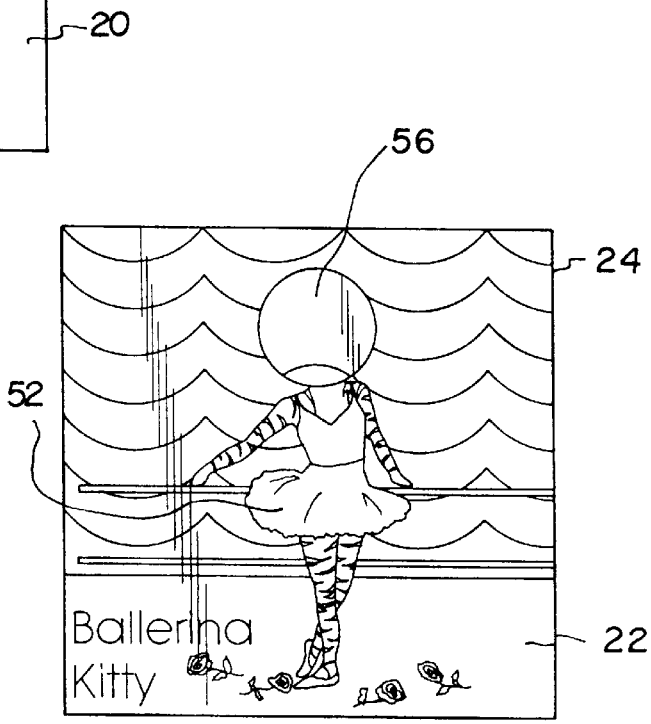
FIG. 5

CAT ENTERTAINMENT BOX

BACKGROUND OF THE INVENTION

1. Field of the Invention

The present invention relates to a cat entertainment box and more particularly pertains to providing entertainment to cats as well as to the care providers of the cats.

2. Description of the Prior Art

The use of toys for pets of known designs and configurations is known in the prior art. More specifically, toys for pets of known designs and configurations heretofore devised and utilized for the purpose of providing entertainment to pets and their owners through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,524,326 to Markowitz, issued Jun. 11, 1996 discloses an interactive game between pet and owner. U.S. Pat. No. 4,391,223 to Holland et al., issued Jul. 5, 1983 discloses a cardboard house for pets. U.S. Pat. No. 4,177,761 to Bellocchi, Jr., issued Dec. 11, 1979 discloses a pet play house. U.S. Pat. No. 3,460,516 to Leonard, issued Aug. 12, 1969 discloses a frame doghouse construction. Lastly, U.S. Pat. No. 1,665,996 to Adams et al., issued Apr. 10, 1928 discloses a device for propagation of clams. Also of interest are foreign patents EP 0 577 457 Al to Eustache et al., Issue/Priority Date Jun. 16, 1993 which discloses a package, especially for industrial products and WO 87/04046 to Mohr, Issue/Priority Date Jul. 16, 1987 which discloses a toy for entertaining a cat.

In this respect, the cat entertainment box according to the present invention substantially departs from the conventional concepts and designs of the prior art, and in doing so provides an apparatus primarily developed for the purpose of providing entertainment to cats as well as to the care providers of the cats.

Therefore, it can be appreciated that there exists a continuing need for a new and improved cat entertainment box which can be used for providing entertainment to cats as well as to the care providers of the cats. In this regard, the present invention substantially fulfills this need.

SUMMARY OF THE INVENTION

In view of the foregoing disadvantages inherent in the known types of toys for pets of known designs and configurations now present in the prior art, the present invention provides an improved cat entertainment box. As such, the general purpose of the present invention, which will be described subsequently in greater detail, is to provide a new and improved cat entertainment box and method which has all the advantages of the prior art and none of the disadvantages.

To attain this, the present invention essentially comprises a cat entertainment system including a box fabricated of a cardboard material in a generally rectilinear configuration having a square floor about 18 inches on edge, a front face, a left face, a right face, and a rear face, each of the faces having a square configuration about 18 inches on edge, and a square top about 18 inches on edge. The edges of the top and floor and four faces are coupled together at their edges to form an integral rectilinear configuration. A hole is located in the to adjacent to the front face and essentially spaced from the side faces with indicia on the top to indicate "feline" in a linear orientation and "fantasy" and "frolic" in an arcuate orientation about a common axis with a top hole. The top hole is about 8 inches in diameter to allow entrance and egress of a cat into and out of the box. Also provided is a design on the front face, left face, right face and rear face. The designs include a cowboy motif with the words "cowboy cat" on the front face, a circus weight lifter motif with the words "big and strong cat" on the left face, a stylish cat motif with the words "glamour kitty" on the rear face and a ballerina motif with the words "ballerina kitty" on the right face. Lastly provided is a circular aperture formed in the front, left and right faces centrally located between the adjacent side edges and closer to the top edge than the bottom edge. Each circular aperture has a diameter of about 5 inches and is located within the motif an associated face whereby when a cat is in the box and pushes its face through one of the circular apertures. Such face of the cat will appear to be part of the motif for entertaining the cat and cat care provider.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved cat entertainment box which has all of the advantages of the prior art toys for pets of known designs and configurations and none of the disadvantages.

It is another object of the present invention to provide a new and improved cat entertainment box which may be easily and efficiently manufactured and marketed.

It is further object of the present invention to provide a new and improved cat entertainment box which is of durable and reliable constructions.

An even further object of the present invention is to provide a new and improved cat entertainment box which is susceptible of a low cost of manufacture with regard to both materials and labor, and which accordingly is then susceptible of low prices of sale to the consuming public, thereby making such cat entertainment box economically available to the buying public.

Even still another object of the present invention is to provide a cat entertainment box for entertaining cats as well as for the entertainment of the care providers of the cats.

Lastly, it is an object of the present invention to provide a new and improved cat entertainment box including a box with a front face, a left face, a right face, and a rear face, a top. The edges of the top and floor and four faces are coupled together at their edges to form an integral rectilinear configuration. A hole is located in the top adjacent to the front face and essentially spaced from the side faces with indicia on the top with a top hole. The top hole allows entrance and egress of a cat into and out of the box. A design is on the front face, left face, right face and rear face. An aperture is formed in the front, left and right faces centrally located between the adjacent side edges and closer to the top edge than the bottom edge.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a left elevational view of the box shown in FIG. 1.

FIG. 4 is a right elevational view of the box shown in FIG. 1.

FIG. 5 is a rear elevational view of a box shown in FIG. 1.

The same reference numerals refer to the same parts through the various Figures.

DESCRIPTION OF THE PREFERRED EMBODIMENT

Figure 1:
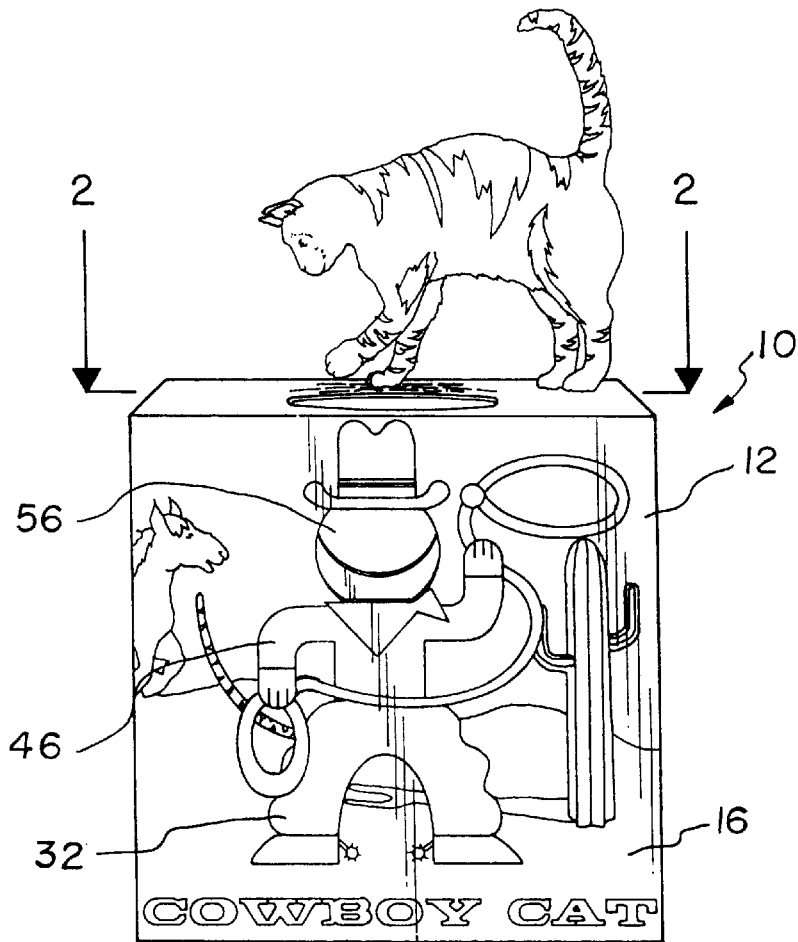
FIG. 1 is a front perspective view of the preferred embodiment of the cat entertainment box constructed in accordance with the principles of the present invention.
Figure 2:
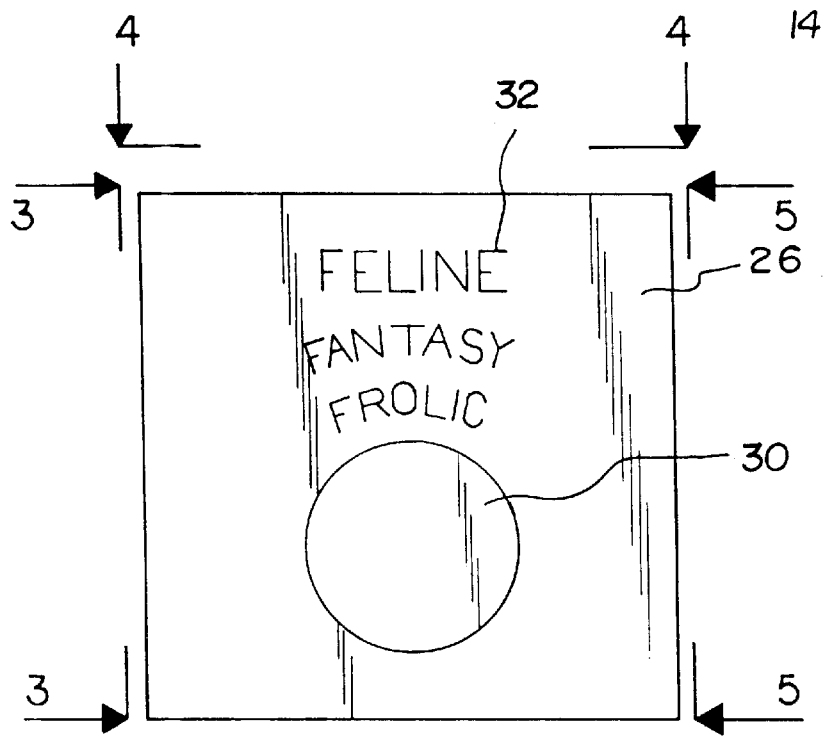
FIG. 2 is a top elevational view of the cat entertainment box shown in FIG. 1.

With reference now to the drawings, and in particular to FIG. 1 thereof, the preferred embodiment of the new and improved cat entertainment box embodying the principles and concepts of the present invention and generally designated by the reference numeral 10 will be described.

The present invention, the cat entertainment system 10 is comprised of a plurality of components. Such components are individually configured and correlated with respect to each other so as to attain the desired objective.

The cat entertainment system 10 as described above comprises, in combination, a box 12 fabricated of a cardboard material in a generally rectilinear configuration. The box has a square floor 14 about 18 inches on edge. The box also has a front face 16, a left face 18, a right face 20, and a rear face 22. Each of the faces have a square configuration 24 about 18 inches on edge, and a square top 26 about 18 inches on edge. The edges of the top and floor and four faces are coupled together at their edges to form an integral rectilinear configuration.

A hole 30 is located in the top adjacent to the front face and essentially spaced from the side faces with indicia 32. This indicia on the top indicates "feline" in a linear orientation and "fantasy" and "frolic" in an arcuate orientation about a common axis with a top hole 30. The top hole is about eight inches in diameter to allow entrance and egress of a cat into and out of the box.

Also provided are designs on the front face 16, left face 18, right face 20 and rear face 22. The designs include a cowboy motif 46 with the words "cowboy cat" on the front face, a circus weight lifter motif 48 with the words "big and strong cat" on the left face, a stylish cat motif 50 with the words "glamour kitty" on the rear face and a ballerina motif 52 with the words "ballerina kitty" on the right face.

Lastly provided is a circular aperture 56 formed in the front, left and right faces centrally located between the adjacent side edges and closer to the top edge than the bottom edge. Each circular aperture has a diameter of about five inches. When a cat is in the box and pushes its face through one of the circular apertures such face of the cat will appear to be part of the motif for entertaining the cat and cat care provider.

The system of the present invention as described hereinabove is a delightful novelty item for cats which will also enchant pet owners. The system is a four-sided cardboard box. The cat will enter the box through the top which reads "enter to fulfill your fantasy . . . you can be a Glamour Kitty, Cowboy Cat, Ballerina Kitty or Big & Strong Cat.

Each side of the box features a detailed sketch of one of the four characters mentioned. A hole where each character's face would be allows the exploring cat inside the box to poke its head through, thus becoming the character on the panel. Amused owners can watch, and even take photographs, as their cat peers through each hole and "tries on" the four characters. As many cat lovers know, felines are entranced by cardboard boxes, and will play for hours, and even sleep in them.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved cat entertainment box to provide entertainment to cats as well as to the care providers of the cats comprising, in combination:

a box fabricated of a cardboard material in a generally rectilinear configuration having a square floor about 18 inches on edge, a front face, a left face, a right face, and a rear face, each of the faces having a square configuration about 18 inches on edge, and a square top about 18 inches on edge, the edges of the top and floor and four faces being coupled together at their edges to form an integral rectilinear configuration;

a hole located in the top of said box adjacent to the front face and essentially spaced from the side faces with indicia on the top of said box to indicate the word "feline" in a linear orientation and the word "fantasy" and the word "frolic" in an arcuate orientation about a common axis with a top hole, the top hole being about eight inches in diameter to allow entrance and egress of a cat into and out of the box;

designs on the front face, left face, right face and rear face, the designs including a cowboy motif with the words "cowboy cat" on the front face, a circus weight lifter motif with the words "big and strong cat" on the left face, a stylish cat motif with the words "glamour kitty" on the rear face and a ballerina motif with the words "ballerina kitty" on the right face; and a circular aperture formed in the front, left and right faces centrally located between adjacent side edges of each said faces and closer to top edges of each said faces than bottom edges of each said faces, each circular aperture having a diameter of about five inches and being located within the motif an associated face whereby when a cat is in the box and pushes its face through one of the circular apertures, such face of the cat will appear to be part of the motif for entertaining the cat and cat care provider.

\* \* \* \* \*